(12) United States Patent
Lippitsch et al.

(10) Patent No.: US 6,253,726 B1
(45) Date of Patent: Jul. 3, 2001

(54) CRANKCASE FOR A COMBUSTION ENGINE

(75) Inventors: Heinz Lippitsch; Thomas Koch; Karl Glinsner, all of Wels (AT)

(73) Assignee: Bombardier-Rotax GmbH, Gunskirchen (AT)

( * ) Notice: Subject to any disclaimer, the term of this patent is extended or adjusted under 35 U.S.C. 154(b) by 0 days.

(21) Appl. No.: 09/566,946

(22) Filed: May 8, 2000

Related U.S. Application Data

(63) Continuation-in-part of application No. PCT/AT98/00265, filed on Oct. 28, 1998.

(30) Foreign Application Priority Data

Nov. 7, 1997 (AT) .................................................... 1878/97

(51) Int. Cl.$^7$ ...................................................... F02F 7/00
(52) U.S. Cl. ............................... 123/195 R; 123/195 C; 123/195 H
(58) Field of Search ........................... 123/195 R, 195 C, 123/195 H

(56) References Cited

U.S. PATENT DOCUMENTS

| | | | |
|---|---|---|---|
| 2,703,263 | 3/1955 | Zernov . | |
| 4,674,455 | * 6/1987 | Tsuboi | 123/195 R |
| 4,753,201 | * 6/1988 | Fukuo et al. | 123/195 R |
| 5,133,313 | * 7/1992 | Inoue et al. | 123/195 C |
| 5,462,366 | 10/1995 | Häusler . | |
| 5,564,837 | * 10/1996 | Putman et al. | 123/195 R |
| 5,829,406 | * 11/1998 | Mazzola et al. | 123/195 R |
| 5,931,135 | * 8/1999 | Yamada | 123/195 C |

FOREIGN PATENT DOCUMENTS

| | | |
|---|---|---|
| 830 443 | 1/1952 | (DE) . |
| 12 95 276 | 5/1969 | (DE) . |

* cited by examiner

Primary Examiner—Marguerite McMahon
(74) Attorney, Agent, or Firm—Pillsbury Winthrop LLP

(57) ABSTRACT

A crankcase (1) is described for a combustion engine with cylinders arranged in V formation that is divided into two parts (2, 3) along a plane of separation (4) going through the axis of the crankshaft (6), such halves connected with each other by means of bearing screws (9) at right angles to the plane of separation (4) on either side of the crankshaft bearing (7), and by means of cylindrical adapters (12), which lock into fitting drill holes (13) provided between the two case halves (2, 3). In order to achieve beneficial construction conditions, it is proposed that the adapters (12) running parallel to the axis of the crankshaft (6) lie in the plane of separation (4) and are each penetrated by one bearing screw (9). In a second embodiment, the adapters (12) are positioned between two of the bearing screws (9) on each side of the crankshaft bearing (7).

5 Claims, 3 Drawing Sheets

CRANKCASE FOR A COMBUSTION ENGINE

This application is a CIP of PCT AT98-00265 dated Oct. 28, 1998.

The invention concerns a crankcase for a combustion engine with cylinders arranged in a V formation, divided into two halves along a dividing line through the axis of the crankcase, such two halves being connected with each other by bearing screws at right angles to the plane of separation on each side of the crankshaft bearing, and by cylindrical adapters that each lock in a fitting drilling between the two case halves.

Since the crankshaft of a combustion engine with a V-shaped cylinder formation is subjected to particular lateral forces parallel to the plane of separation of the crankcase, these lateral forces must be transmitted via the crankshaft bearings to the two halves of the crankcase bearing the crankshaft. The crankshaft bearings are made of comparatively thin bearing shells inserted in bearing drill holes between the two halves of the crankcase. This means that the two halves of the crankcase cannot be centred via the crankshaft bearings. In order to achieve an appropriate centring of the crankcase halves to be connected to each along a continuous plane, it is known (U.S. Pat. No. 4,674,455) that the two crankcase halves can be screwed together by means of bearing screws on both sides of the crankshaft bearings, such screws having cylindrical adapters in the area of the plane of separation between the two crankcase halves. These adapters lock into fitting drill holes on both sides of the plane of separation at right angles to the plane of separation penetrated by the bearing screws, such that the bearing screw adapters locking in the flush fitting drill holes of the crankcase halves can be used to centre the crankcase halves with respect to the drill holes for the crankshaft bearings and can be connected with each other in a manner permitting the transmission of forces. The disadvantage of this know design is, however, that the fitting drill holes of the two crankcase halves at right angles to the plane of separation require considerable manufacturing effort because of the drilling accuracy needed. Despite the required high drilling accuracy, the take-up of load via the adapters of the bearer screws is impaired by the inevitable tolerances.

Thus the invention is based on the problem of designing a crankcase of the type described at the beginning for a combustion engine with cylinders arranged in a V formation in such a way that an exactly centred and load-transmitting connection between the two halves of the crankcase can be ensured with a minimum of manufacturing effort.

The invention solves the problem set by having the adapters running parallel to the axis of the crankshaft located in the plane of separation and each penetrated by one bearing screw.

Since the adapters are in the plane of separation and run parallel to the axis of the crankshaft, the fitting drill holes for these adapters can be drilled together with the bearing drill holes for the crankshaft bearings, which combines simple construction conditions with high accuracy. Since the centring and the removal of the load parallel to the plane of separation is achieved by the adapters separate from the bearing screws, there is no need for fitting drill holes for the bearing screws, with the result that the seat drill holes for the bearing screws can be made without particular accuracy. Despite the adapters separate from the bearing screws, a compact hardly protruding design is ensured since the adapters are penetrated by the bearing screws. In this way, the bearing screws penetrating the adapters fix the adapters in the axial direction, with the result that there is no need for additional design measures.

If two bearing screws are provided on each side of the crankshaft bearings, it is recommended that the adapters be located in the area of the outer bearing screws in each case in order to keep a small distance between the inner bearing screws and the corresponding bearing drill hole.

In a further embodiment of the invention, at least two bearing screws are positioned on either side of each crankshaft bearing and the adapters are respectively positioned parallel to the crankshaft axis in the plane of separation between any two screws on each side of the crankshaft bearing.

Figure 1:
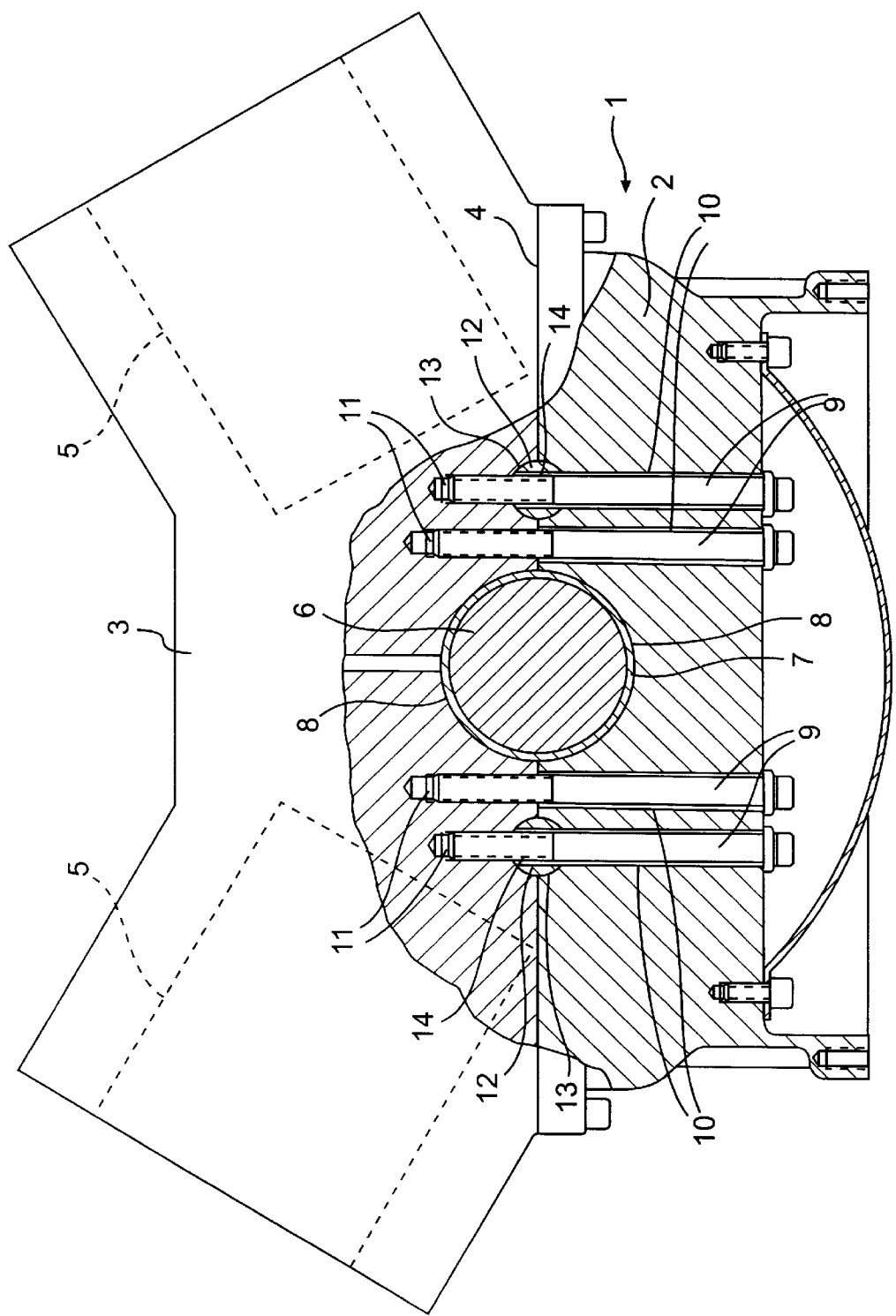
FIG. 1 represents an example of the subject matter of the invention, showing a crankcase according to the invention for a combustion engine with cylinders arranged in a V formation in a schematic, partly cut-away front view.

The crankcase 1 shown in the FIGS. features two halves 2 and 3 whose plane of separation is marked with 4. The upper part 3 of the crankcase 1 forms the seats 5 for the cylinder liners of the cylinders arranged in V formation. The crankshaft 6 is mounted between the crankcase halves 2 and 3 in crankshaft bearings 7, which consist of comparatively thin bearing shells inserted in bearing drill holes 8 between halves 2 and 3. To the side, next to the bearing drill holes 8, the crankcase halves 2 and 3 are connected with each other by means of bearing screws 9 that penetrate the crankcase half 2 through drill holes 10 and lock into threaded drill holes 11 of crankcase half 3. In order to centre the two crankcase halves 2 and 3 with respect to bearing drill holes 8, cylindrical adapters 12 are provided that run parallel to the axis of crankshaft 6 and lie in the plane of separation 4. These adapters 12 lock into fitting drill holes 13 between crankcase halves 2 and 3 such that adapters 12 not only permit the centring of crankcase halves 2 and 3 but also a transmission of forces parallel to plane of separation 4. Since the fitting drill holes 13 can be drilled together with bearing drill holes 8, a precise alignment of crankcase halves 2 and 3 with respect to the axis of crankshaft 6 can be guaranteed with simple means irrespective of the accuracy of the arrangement of bearing screws 9.

In the first embodiment shown in FIG. 1, adapters 12 contain penetration holes 14 for the corresponding bearing screws 9, with the result that adapters 12 can be fixed axially by means of the bearing screws 9 penetrating them. In addition, a compact design is ensured, since the separate adapters 12 do not create an additional need for space to the side next to the bearing screws 9. Since the adapters 12 have been allocated to the outer bearing screws 9, the inner bearing screws 9 can be located close to bearing drill holes 8.

Figure 2:
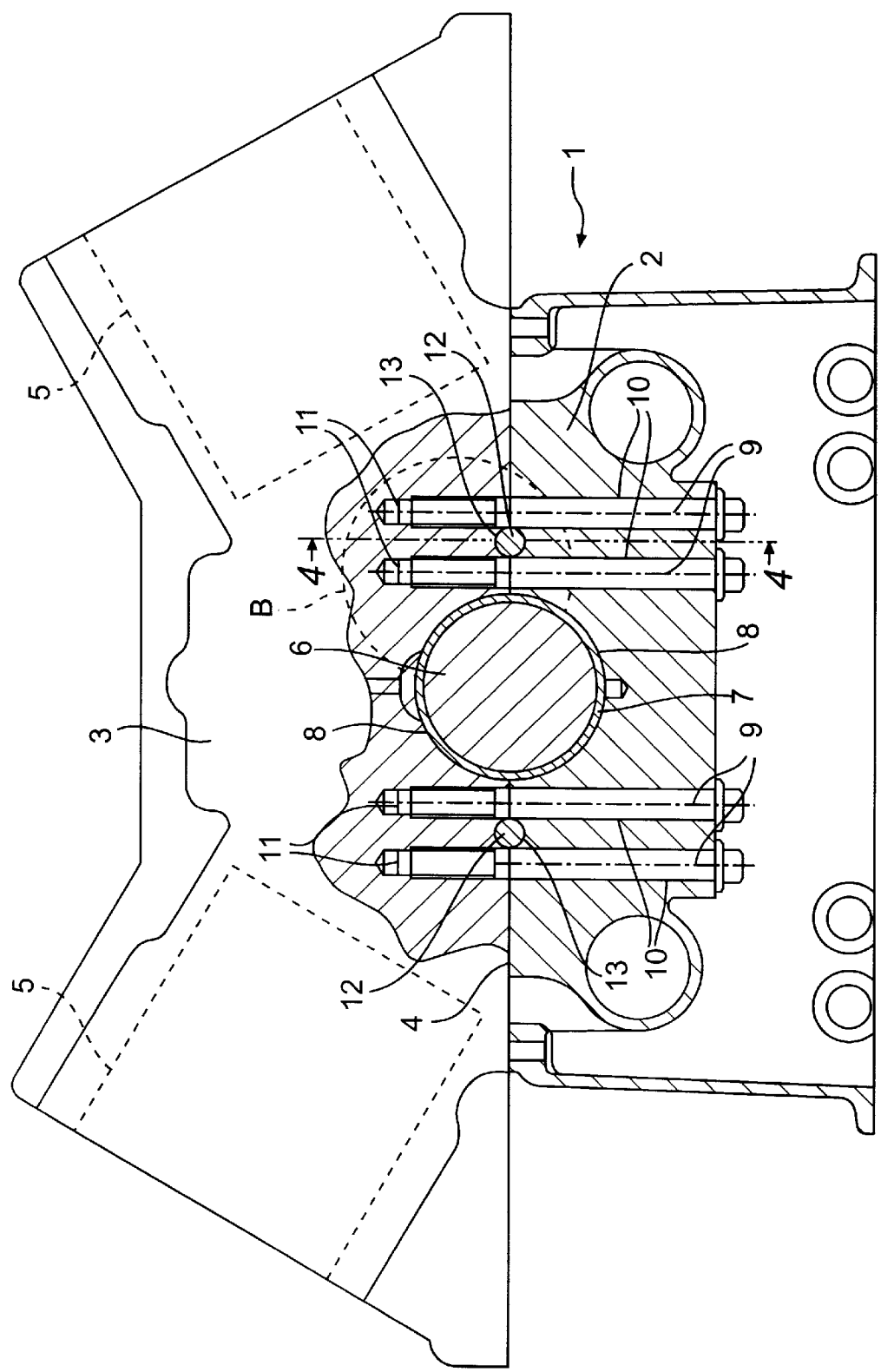
FIG. 2 is a view similar to FIG. 1 showing an example of the second embodiment of the present invention.
Figure 3:
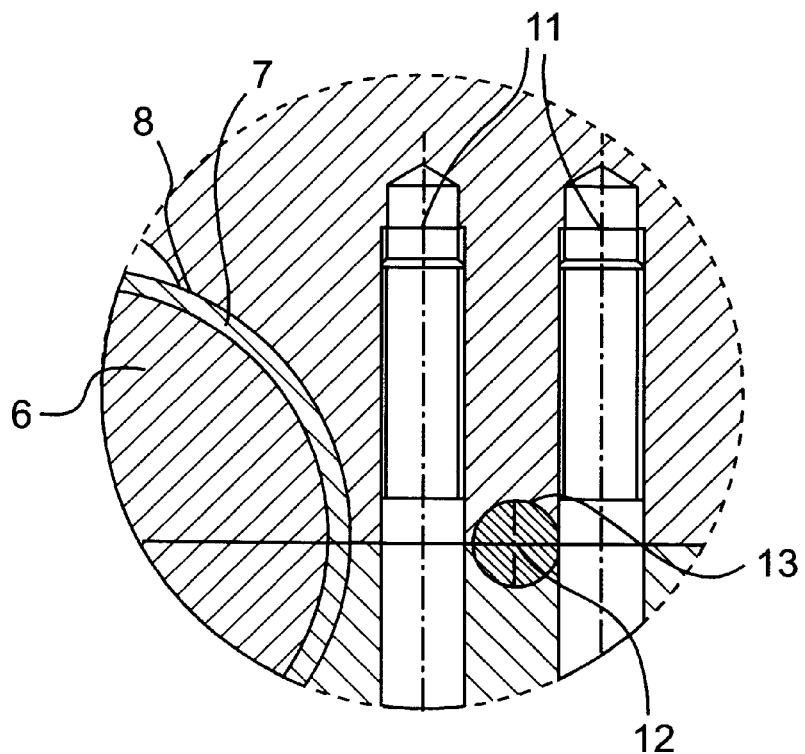
FIG. 3 is an enlarged view of a portion of FIG. 2.
Figure 4:
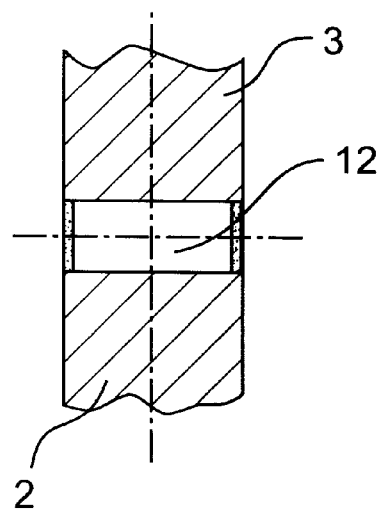
FIG. 4 is a partial section view along section line 4—4 in FIG. 2.

A second embodiment is shown in FIGS. 2–4. This embodiment improves the mechanical stresses in the crankshaft housing parts, especially in the main bearing walls, by locating the adapter holes 13 and adapters 12 between any two bearing screws 9 on either side of the crankshaft bearing hole 8. This moves the adapters 12 further towards the crankshaft center while maintaining the position of the inner bearing screws 9 close to the bearing 7. To minimise the spacing between the bearing screws 9 on each side of the crankshaft bearing 7, the bearing screws 9 can be spaced just far enough apart to accommodate adapter hole 13 and adapter 12.

In this way, the adapter holes 13 and adapters 12 are moved further away from the lower end of the cylinders of the near cylinder bank which results in a better mechanical stress distribution in the main bearing wall. In addition, in this embodiment, the threaded lengths of the screws 9 in the connected housing part can be of equal length, thus maintaining the same potential for pretensioning of the screws and safety margin against overtorquing the threads in the connected crankcase half 3.

Furthermore, the mechanical stress concentration at the end of the thread in the connected crankcase half 3 is reduced by a longer thread length and/or beginning the thread some distance away from the parting line 4 as can be accomplished when the available thread length is increased. With regard to mechanical stresses, the effective main bearing wall height in both crankcase halves at the screws 9 is increased as compared to the first embodiment where the parting plane 4 at the screws 9 transverses the adapters 12.

The invention described herein can be applied favourably to all V-engines and in-line engines with housing parting planes not perpendicular to the cylinder axes.

What is claimed is:

1. A crankcase (1) for a combustion engine with cylinders arranged in V formation that is divided into two parts (2, 3) along the plane of separation (4) going through the axis of the crankshaft (6), such halves connected with each other by means of bearing screws (9) at right angles to the plane of separation (4) on either side of the crankshaft bearing (7), and by means of cylindrical adapters (12), which lock into fitting drill holes (13) provided between the two case halves (2, 3), characterised by the fact that the adapters (12) running parallel to the axis of the crankshaft (6) lie in the plane of separation (4) and each are penetrated by one bearing screw (9).

2. A crankcase according to claim 1, characterised by the fact that where two bearing screws (9) are located on each side of the crankshaft bearings (7), the outer bearing screws (9) penetrate the adapters (12).

3. A crankcase according to claim 2, characterised by the fact that the bearing screws (9) penetrating the adapters (12) are shorter that the other bearing screws (9).

4. A crankcase (1) for a combustion engine with cylinders arranged in V formation that is divided into two parts (2, 3) along the plane of separation (4) going through the axis of the crankshaft (6), such halves connected with each other by at least two bearing screws (9) at right angles to the plane of separation (4) on each side of the crankshaft bearing (7), and by means of cylindrical adapters (12), which lock into fitting drill holes (13) provided between the two case halves (2, 3), characterised by the fact that the adapters (12) running parallel to the axis of the crankshaft (6) lie in the plane of separation (4) and are positioned between any two bearing screws (9) on either side of the crankshaft bearing (7).

5. A crankcase according to claim 4, characterised by the fact that the bearing screws (9) are substantially the same length.

* * * * *